(12) United States Patent
Rozzi et al.

(10) Patent No.: US 8,061,241 B2
(45) Date of Patent: Nov. 22, 2011

(54) INDIRECT COOLING OF A CUTTING TOOL

(75) Inventors: Jay Christopher Rozzi, Hanover, NH (US); Weibo Chen, Hanover, NH (US); Everett Edgar Archibald, Jr., Windsor, VT (US)

(73) Assignee: Creare Incorporated, Hanover, NH (US)

( * ) Notice: Subject to any disclaimer, the term of this patent is extended or adjusted under 35 U.S.C. 154(b) by 386 days.

(21) Appl. No.: 12/418,688

(22) Filed: Apr. 6, 2009

(65) Prior Publication Data

US 2010/0254772 A1 Oct. 7, 2010

(51) Int. Cl.
*B23B 3/00* (2006.01)
*B23Q 11/10* (2006.01)

(52) U.S. Cl. .............................................. 82/46; 407/11

(58) Field of Classification Search .................. 407/11; 82/46, 50, 173
See application file for complete search history.

(56) References Cited

U.S. PATENT DOCUMENTS

| | | | | |
|---|---|---|---|---|
| 3,889,520 | A * | 6/1975 | Stoferle et al. | 73/37.5 |
| 5,237,894 | A * | 8/1993 | Lindeke | 82/1.11 |
| 5,761,974 | A * | 6/1998 | Wang et al. | 82/1.11 |
| 5,799,553 | A * | 9/1998 | Billatos | 82/1.11 |
| 6,053,669 | A * | 4/2000 | Lagerberg | 407/11 |
| 6,637,984 | B2 * | 10/2003 | Murakawa et al. | 407/11 |
| 7,634,957 | B2 * | 12/2009 | Ghosh et al. | 82/1.11 |

FOREIGN PATENT DOCUMENTS

| | | |
|---|---|---|
| DE | 102008020740 A1 | 10/2009 |
| EP | 1199126 A1 | 4/2002 |
| EP | 1637257 A1 | 3/2009 |
| WO | 9960079 | 11/1999 |
| WO | 01/49448 A1 | 7/2001 |
| WO | 2008/104341 | 9/2008 |

OTHER PUBLICATIONS

Sutherland, J.W., 2000, "Cutting Fluid Issues," www.mfg.mtu/marc/research.
Zhao, Z. and Hong, S.Y., 1992, "Cooling Strategies for Cryogenic Machining from a Materials Viewpoint," Journal of Materials Engineering and Performance, vol. 1, No. 5, pp. 669-678.
Paul, S., Dhar, N.R., Chattopadhyay, A.B., 2001,"Beneficial Effects of Cryogenic Cooling Over Dry and Wet Machining on Tool Wear and Surface Finish in Turning AISI 1060 Steel," Journal of Materials Processing Technology, vol. 116, pp. 44-48.
Nishiwaki, N., Hidehiko, T., and Hori, S., 1981, "A Method for Improving the Thermal Behaviour of Machine Tools with Heat Pipes," Bulleting of the Japan Society of Precision Engineering, vol. 15, No. 4, pp. 249-250.

(Continued)

*Primary Examiner* — Will Fridie, Jr.
(74) *Attorney, Agent, or Firm* — Reising Ethington P.C.

(57) ABSTRACT

A cutting tool having a cutting element such as an insert is cooled indirectly by a micro-channel heat exchanger that is mounted against the rear face of the insert. The heat exchanger is formed with an internal cavity that receives a coolant such as a cryogen. The cavity may include fins to enhance the removal of heat by the cryogen from the insert. Coolant inlet and outlet tubes are coupled to the interior of the heat exchanger to supply cryogen to the cavity. The flow rate of cryogen required to cool the insert during a given machining operation is less than one percent of the amount of standard coolant required to cool the same insert during the same machining operation.

18 Claims, 3 Drawing Sheets

OTHER PUBLICATIONS

Hong, S.Y. and Ding, Y., 2001, "Micro-Temperature Manipulation in Cryogenic Machining of Low Carbon Steel," Journal of Materials Processing Technology, vol. 116, pp. 22-30.

Lopez de Lacalle, L., Perez-Bilbatua, J., Sanchez, J., Llorente, J., Gutierrez, A., and Alboniga, J., 2000, "Using High Pressure Coolant in the Drilling and Turning of Low Machinability Alloys," International Journal of Advanced Manufacturing Technology, vol. 16, pp. 85-91.

Wang, Z.Y. and Rajurkar, K.P., 2000, "Cryogenic Machining of Hard-to-Cut Materials," Wear, vol. 239, pp. 168175.

PCT/US2010/029950 Forms PCT/ISA/210 and PCT/ISA/237 International Search Report and Written Opinion, Date of Mailing: Jan. 25, 2011, 6 pages.

\* cited by examiner (Prior Art)
FIG. 1

INDIRECT COOLING OF A CUTTING TOOL

This invention was made with Government support under Contract Nos. 68-D-02-016, 68-D-03-042, and DAAE30-03-D-1009-2 awarded by the Environmental Protection Agency and the Department of the Army. The Government has certain rights in the invention.

FIELD

The device disclosed is an indirect cooling system for the tool-chip interface that uses a micro-channel heat exchanger installed on the tool holder to remove a portion of the thermal energy generated during machining.

BACKGROUND

Cutting fluids have been used in machining processes for many years to increase lubricity by spraying the coolant into the machining zone directly on the cutting tool and the part. This has the effect of decreasing the friction between the chip and the tool, which in turn decreases the tool temperature, increases tool life, and improves the part quality. These benefits come with certain drawbacks. In high-volume machining operations, at least 16% of the machining cost is associated with the procurement, maintenance, and disposal of cutting fluids. This cost does not account for the health risks that workers are exposed to when using these fluids. Contact with cutting fluids or their mists can cause maladies such as dermatitis and respiratory diseases. Some additives in cutting fluids may be carcinogenic.

In recent years, because of these problems, the high-volume machining industry has moved toward dry machining to reduce or eliminate the use of cutting fluids. However, dry machining increases fossil fuel consumption and energy costs because larger and more powerful machines are required to process the less lubricious material. Dry machining also increases the per part costs by consuming more cutting tools and requiring more machining time. The problem is exacerbated when machining titanium and other low thermal conductivity materials since the heat produced at the tool-chip interface is not readily conducted away from the interface by the material itself. Further, dry machining is not feasible for relatively small shop sites, where the capital for new machines is often not available.

Past research efforts and patents have focused on internally or externally cooling the cutting tool holder, spraying liquid nitrogen into the machining zone, using high-pressure coolants, and the integration of a cap-like reservoir on top of the cutting tool insert that is cooled by liquid nitrogen.

Internally and externally cooling the cutting tool has been experimentally tested using heat pipes. Some degree of cooling was achieved, but the heat transfer efficiency of the design is very low. No measurements of cutting tool flank wear reduction were made, possibly due to the poor performance of the system on the bench-top.

Spraying a jet of liquid nitrogen into the machining zone has proven to be an effective means to cool the cutting tool, but a large amount of liquid nitrogen is used in the process owing to the comparatively low heat transfer effectiveness of this approach. This increases the environmental impact of the liquid nitrogen jet for two reasons. First, a ventilation system is required to remove the large amounts of nitrogen vapor created during the cooling process. Second, the electrical power needed to produce the large amount of liquid nitrogen used by this cooling method requires more fossil fuel and, correspondingly, increases pollution.

The use of high pressure jets of coolant to reduce the tool wear has also been investigated. Such an approach can effectively decrease tool wear, but has several drawbacks. First, the jets require pressurized coolant using a large compressor that consumes electrical power, which increases the cost and environmental impact of the process. Second, the jets need to be applied to particular locations on the cutting tool insert. This requires accurate and repeatable positioning of the small diameter, high-pressure jet relative to the cutting tool insert. This approach is not feasible in a production environment, where the overhead associated with managing the high-pressure liquid jet quickly drives up the machining time and the costs. Third, the high-pressure jets require liquid flow rates that are one to three orders of magnitude larger than indirectly cooling the tool-chip interface as disclosed herein. This fact dramatically increases the cost and the environmental impact of using high pressure jets.

Another approach involves the integration of a cap-like reservoir cooled with liquid nitrogen on top of the cutting tool insert, and this has been shown to decrease the tool wear. This arrangement has a relatively low heat transfer efficiency however, and as a result the necessary flow rates are two to three orders of magnitude larger than the method that is disclosed herein. Because the reservoir is located on top of the cutting tool insert, the device is difficult to use in a production environment. In order to index or change the insert, the operator needs to remove and reattach the reservoir, which is at cryogenic temperatures. These operations require special training, increasing costs, and increases the health risks to operators. For these reasons, it is unlikely that such a system would be used in a production environment.

SUMMARY

As described below, a cutting tool is cooled indirectly using very small flow rates of a cryogenic coolant such as, liquid nitrogen as a working fluid. As used herein, the term cryogenic or cryogen refers to a liquid, such as liquid nitrogen, that boils at a temperature below about 110 K (−160° C.) and is used to obtain very low temperatures. The main benefit of using a cryogenic liquid in this application is the use of the latent heat of vaporization of the cryogen as a means to remove heat from the tool-chip interface. As opposed to sensible heat transfer, where any heat gain by a single-phase fluid is accompanied by a temperature rise; latent heat transfer uses the isothermal phase change from a saturated liquid to vapor as a means to absorb heat. This approach eliminates the environmental and occupational health problems posed by traditional cutting fluids, and allows small and large machine shops to eliminate the use of environmentally unfriendly, potentially toxic, and costly cutting fluids. In addition, the indirect cooling uses a flow rate for the working fluid that is several orders of magnitude smaller than direct cooling methods, such as the jet impingement of machining coolant or prior art using liquid nitrogen or other cryogens. Indirect cooling decreases the environmental impact of machining operations while simultaneously decreasing production costs.

The indirect cooling uses a micro-channel heat exchanger that is placed behind the cutting element and uses liquid nitrogen as the working fluid. In comparison to heat pipes, indirect cooling has a very high heat transfer efficiency, and provides reduced tool wear and lower part production costs.

In comparison to spraying nitrogen into the cooling zone, indirect cooling of the cutting element uses two to three orders of magnitude less nitrogen due to its high heat transfer efficiency. Thus, the environmental impact of liquid nitrogen production is very small compared to jet cooling with liquid nitrogen or to traditional flood cooling with a typical machining coolant. Additionally, indirect cooling of the cutting element enables the key technology to be embedded in the tool and increase the usability and affordability of the system in a production environment.

DESCRIPTION OF THE PREFERRED EMBODIMENT

Figure 1:
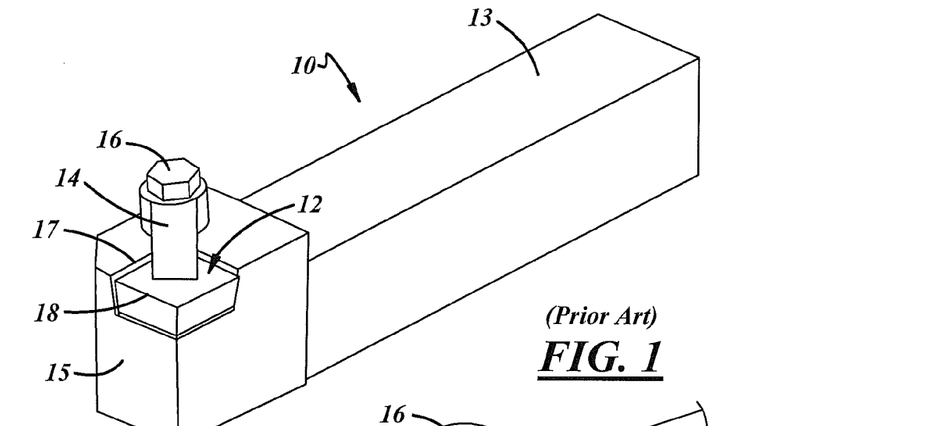
FIG. 1 shows a prior art tool holder and insert for a non-rotating tool.

FIG. 1 shows typical prior art cutting tool generally designated by the reference numeral 10. The cutting tool 10 comprises a cutting element such as an insert 12 that is held in a holder 13 by a clamp 14 that can be tightened against the insert 12 by a screw 16. The insert 12 fits into a pocket 17 formed in the end of the holder 13, and the cutting edge 18 of the insert 12 extends beyond the end 15 of the holder 13 so that the cutting edge can engage a material that is being cut by the tool 10. If the insert is square as shown, the insert may be rotated ninety degrees when the cutting edge 18 becomes worn to expose a fresh side of the insert to the material being cut. If used in this way, the square insert 12 actually has four cutting edges 18. Other inserts are also well known having other numbers of cutting edges. This type of cutting tool and holder may be used in an application where the cutting tool does not rotate, such as for example in a turning machine or lathe.

Figure 2:
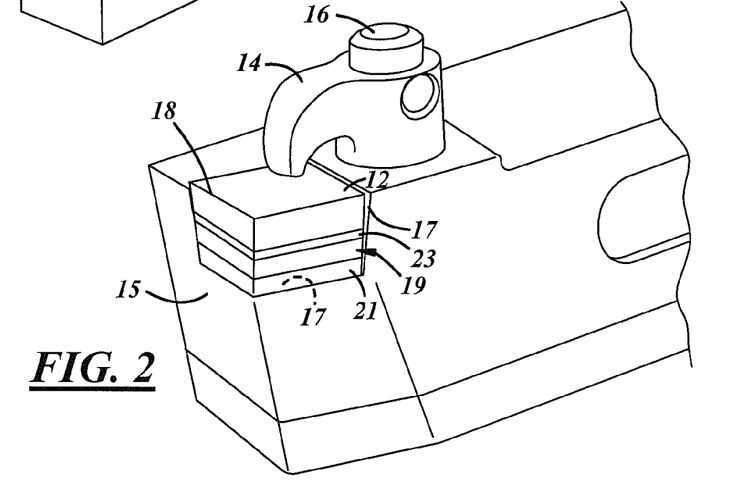
FIG. 2 is an enlarged view of the end of a tool holder with an insert having indirect cooling.

FIG. 2 shows a cutting tool 10 that has been modified to apply indirect cooling to the insert 12. A thermal insulator 21 is placed in the pocket 17 and a heat exchanger 19 is positioned on the thermal insulator 21. A thermal conductor plate 23 is placed on top of the micro-channel heat exchanger 19 and the insert 12 is positioned on top of the thermal conductor 23. The clamp 14 is used to hold the stack of elements in the pocket 17.

Figure 3:
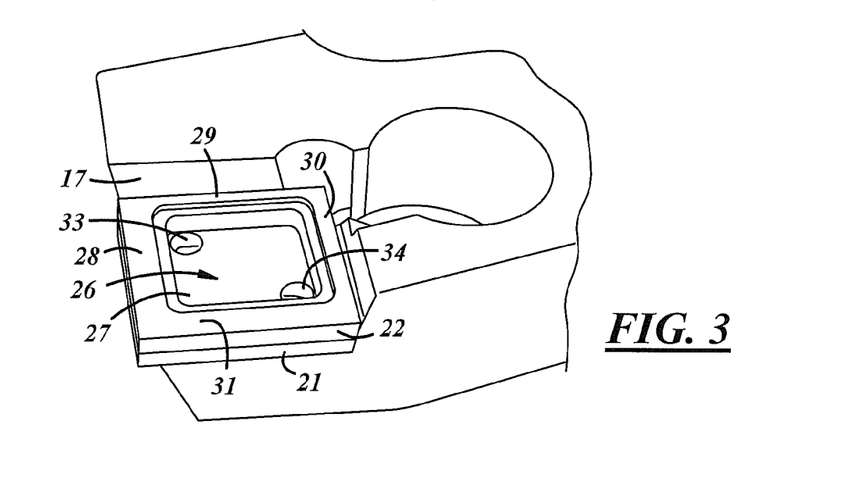
FIG. 3 is a detail view of the interior of a heat exchanger that is mounted under the insert of FIG. 2.

FIG. 3 is a detail view of the end of the holder 13 and the heat exchanger manifold 22 that is a part of the micro-channel heat exchanger 19. The thermal insulator 21 is mounted in the pocket 17 of the holder 13 and the heat exchanger manifold 22 is mounted on the thermal insulator 21. The thermal insulator 21 may be affixed to the heat exchanger manifold 22 and the assembly of the two items may be affixed to the pocket 17 by electron beam welding, although other forms of attachment may be used. The heat exchanger manifold 22 comprises a generally rectangular cavity 26 formed by a floor 27 that is surrounded by four walls 28-31. A first aperture 33 is formed in one corner of the cavity 26 and a second aperture 34 is formed in a second corner that is located diagonally opposite from the first aperture 33. In one embodiment of the invention, the first aperture 33 is an inlet for coolant to be admitted to the cavity 26, and the second aperture 34 is an outlet for coolant to be exhausted from the cavity. A rabbet or groove 36 is formed along the top surface of the walls 28-31 to receive a cover plate 38 for the heat exchanger as described more fully below.

Figures 4, 5:
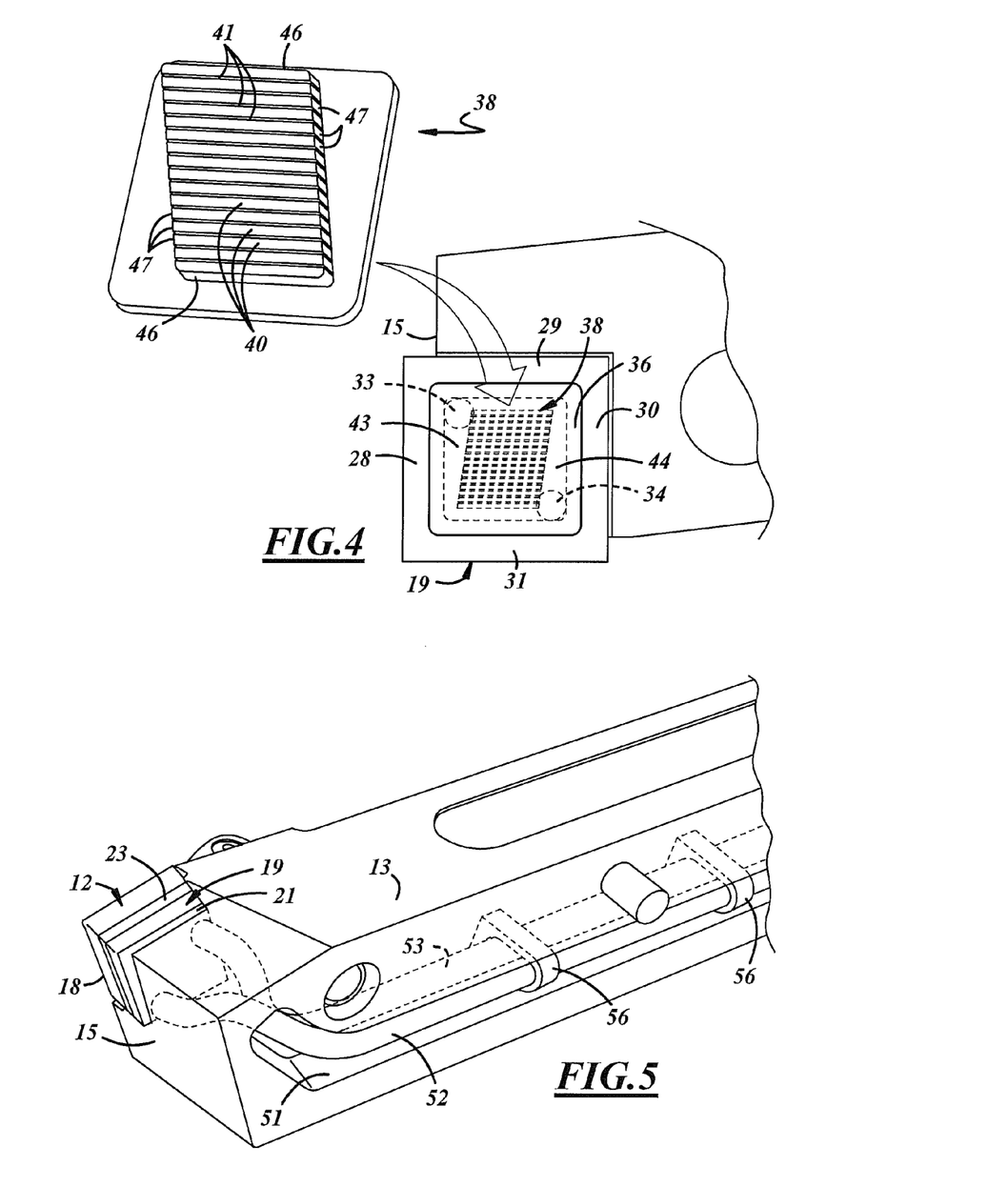
FIG. 4 shows the underside of the cover plate for the heat exchanger shown in FIG. 2, and is a top view of the end of the tool holder with the cover plate in place on the heat exchanger.
FIG. 5 shows the underside of the tool holder of FIG. 2.

FIG. 4 shows the underside of the heat exchanger cover plate 38 that is mounted on top of the heat exchanger manifold 22. A plurality of parallel heat transfer fins 40 that are separated from one another by channels 41 are formed on the interior surface of the heat exchanger cover plate 38. When the heat exchanger cover plate is mounted over the cavity 26 of the heat exchanger manifold 22 as shown in FIG. 5, the heat transfer fins 40 extend into the cavity, and increase the heat exchange between the coolant in the cavity and the cutting insert 12 that is mounted on the end of the holder 13.

FIG. 4 also shows the interior of the cavity 26 when the heat exchanger cover plate 38 is positioned on the walls 28-31 that surround the cavity. The heat exchanger cover plate 38 fits into the rabbet 36 that is formed on the top of the four walls. A coolant inlet zone 43 is formed on the interior of the micro-channel heat exchanger 19 where the coolant from the inlet aperture 33 enters the heat exchanger, and this is the coldest region of the heat exchanger. The coolant inlet zone 43 is located adjacent to the cutting edge 18 of the insert when the insert is clamped in the holder 13. A coolant outlet zone 44 is formed on the interior of the micro-channel heat exchanger 19 where the coolant from the heat exchanger is collected and routed to the coolant outlet aperture 34. In one embodiment, the heat transfer fins 40 are arranged in the shape of a parallelogram so that the sides 46 of the heat transfer fins are parallel to the boundary walls 29 and 31 and the ends 47 of the heat transfer fins form a locus of points that is at an angle to the boundary walls 28 and 30. The parallelogram shape of the array of heat transfer fins 40 give both the coolant inlet zone 43 and the coolant outlet zone 44 a triangular shape, with the coolant inlet 33 and the coolant outlet 34 being located next to the short side of the triangle. The heat exchanger cover plate 38 mounts on top of the boundary walls 28-31 to enclose the heat transfer fins 40, and the coolant inlet and outlet zones 43 and 44, respectively. When mounted on the boundary walls 28-31, the tops of the heat transfer fins 40 are in contact with the floor 27 of the cavity 26 to confine the flow of coolant through the micro-channel heat exchanger 19 to the channels 41 formed between the fins.

FIG. 5 is a perspective view of the underside of the tool holder 13. A groove 51 is formed in the underside of the holder, and a coolant inlet tube 52 and a coolant outlet tube 53 are mounted in the groove 51. This groove 51 is terminated at the rear of the tool holder (not shown) and evacuated to form a thermally insulating vacuum space. The coolant inlet tube 52 is coupled to the coolant inlet aperture 33 in the heat exchanger cavity 26, and the coolant outlet tube 53 is coupled to the coolant outlet aperture 34. Mounting blocks 56 of heat insulating material may be positioned between the body of the holder 13 and coolant inlet and outlet tube 52 and 53, respectively, to minimize heat leak from the tubes to the holder 13, and to mechanically support the tubes on the holder. These mounting blocks 56 are not connected to the tool holder 13 to eliminate a potential conductive heat leak from the warm tool holder 13 to the coolant inlet tube 52. The coolant inlet and outlet tubes 52 and 53 may be protected by an outer shield (not shown) that covers the groove 51. In use, the coolant inlet tube 52 normally carries liquid nitrogen ($LN_2$) to the heat exchanger 19, and the coolant outlet tube 53 normally carries warmed liquid nitrogen which may be in a gaseous state from the heat exchanger 19. In another embodiment, the outlet tube may be routed to the end 15 of the tool holder to provide additional cooling. The thermal insulator 21 minimizes heat transfer between the tool holder 13 and the heat exchanger 19, and the thermal conductor 23 optimizes the heat transfer between the heat exchanger 19 and the insert 12. The thermal insulator 21 and the thermal conductor 23 optimize the performance of the heat exchanger 19, but are not absolutely required for the heat exchanger to perform its function of cooling the insert 12.

Although the cutting tool described herein uses an insert 12 having a cutting edge 18, those skilled in the art will recognize that the principles of the device may be applied to cutting tools that use non-insert type fixed cutting elements such as polycrystalline diamond (PCD) or carbide cutting elements that are brazed, affixed, or otherwise integral to a cutting tool body.

In use, heat from the insert 12 is coupled by the thermal conductor 23 to the fins 40 of the heat exchanger 19. The liquid nitrogen ($LN_2$) issues to the coolant inlet tube 53 from a fixed source (not shown) to an interface on the rear of the tool (not shown). As the $LN_2$ exits the source, a small amount of heat transfer from the environment vaporizes a small amount of the cryogen prior to entering the coolant inlet tube 52. At this point, the nitrogen is known as two-phase fluid (partially liquid and partially gas). Hereafter, liquid nitrogen is referred to as ($LN_2$) if the majority of the two-phase fluid, on a mass basis, is liquid. Gaseous nitrogen is referred to as ($GN_2$) if the majority of the two-phase fluid, on a mass basis, is gas. The liquid nitrogen ($LN_2$) from the coolant inlet tube 52 enters the coolant inlet zone 43 and provides maximum cooling to the cutting edge 18 of the insert prior to the liquid nitrogen passing through the channels 41 between the heat transfer fins 40. As the coolant passes through the heat transfer fins 40, heat from the insert 12 is transferred to the ($LN_2$) which absorbs this heat by vaporizing some of the liquid to gas. The $GN_2$ then collects in the coolant outlet zone 44. The liquid nitrogen in the heat exchanger uses the latent heat of vaporization of the ($LN_2$) to remove heat from the insert 12. This latent heat transfer uses the isothermal phase change of the liquid nitrogen from a saturated liquid to vapor as a means to absorb heat. In the embodiment shown, $GN_2$ in the coolant outlet zone is ducted to the coolant outlet tube 53 and away from the working end of the tool holder 13. In another embodiment (not shown), the $GN_2$ may be routed to an aperture in the end 15 or the bottom of the tool holder and exhausted to atmosphere.

Test Results

Figure 6:
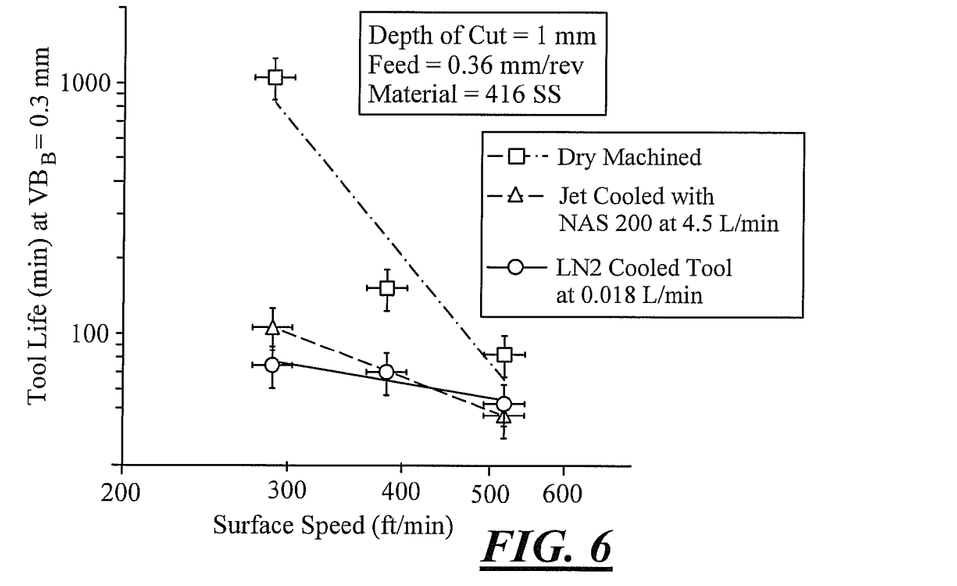
FIG. 6 is a graph showing the effect of the use of a heat exchanger with a micro-channel finned surface on tool life at various cutting speeds.

FIG. 6 is a plot of the tool-life results from machining tests on 416 stainless steel for dry machining, jet cooling with a commercially available coolant such as NAS 200™ machine coolant, and cooling using the cutting tool with indirect insert cooling. At all of the cutting speeds used in the tests, the cutting tool system with indirect insert cooling produced much longer tool life than dry machining or jet cooling with the machine coolant.

Tests show that the extent of the flank wear land for the cutting tool system with indirect cooling is much smaller than either dry cutting or jet cooling with NAS 200™ machine coolant. The excessive heating during dry machining results in some built-up-edge on the cutting tool. No such build-up was observed on the cutting tool with indirect insert cooling.

The parts were examined after the machining experiments and their dimensional accuracy was measured. The arithmetic mean surface roughness and the Rockwell B hardness were also measured. The results from these measurements are given below in Table 1.

TABLE 1

Post-Test Examinations of the Machined Parts

| | Dimensional Accuracy (mils) | Arithmetic Mean Surface Roughness (μm) | Rockwell B Hardness of Machined Surface (±1 RBH) |
|---|---|---|---|
| Dry Machining | 5 | >6.5 | 85 |
| Jet Cooling with NAS 200 ™ | 4 | >6.5 | 84 |
| Cutting Tool with Indirect Insert Cooling | 4 | 5.7 | 83 |

The dimensional accuracy of all of the parts was within the machine or operator error. The instrument that was used to measure surface roughness is limited to values of 6.5 μm or less. The machined surfaces of the dry machined and the jet cooled parts were above this value. The average surface roughness of the machined part using the cutting tool system of FIG. 2 using indirect insert cooling was always below 6.5 μm, with an average value of 5.7 μm. The measurements show no statistically significant hardness variation of the machined surface regardless of the cutting condition indicating that each cutting condition results in the same microstructure near the surface. These results show that tool cooling using the cutting tool system with indirect insert cooling results in an accurate, smooth part with no unexpected microstructure variations.

Figure 7:
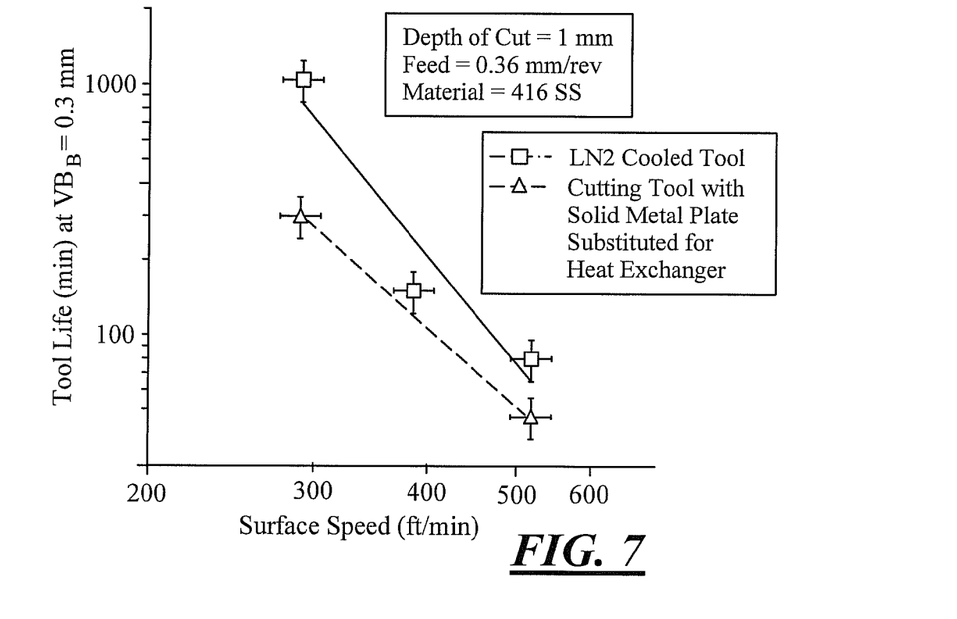
FIG. 7 is a graph showing the effect of the use of a heat exchanger without a micro-channel finned surface on tool life at various surface speeds.

It is believed that the long tool life provided by the cutting tool system with indirect cooling is the result of the microchannel heat exchanger 22 that is positioned behind the cutting tool insert 12. The heat exchanger 22 increases the heat transfer coefficient and the heat transfer area, both of which decrease the thermal resistance between the rear face of the insert and the liquid nitrogen that is used to cool the heat exchanger. To demonstrate this effect, the micro-channel heat exchanger 22 was removed and a metal plate with no microchannels was inserted in its place. The test results are given in FIG. 7. While the performance of the cutting tool similar to the cutting tool with indirect insert cooling but without the heat exchanger 22 is better then dry cutting or jet cooling with the machine coolant, with the micro-channel heat exchanger 22 removed, the cooling capacity and the tool life of cutting tool system decreased.

Temperature measurements taken on the back of the insert during machining confirm that the micro-channel heat exchanger in the cutting tool system reduces the temperature of the insert by more than 220 Kelvin compared to dry cutting. For conventional cooling and dry machining, the temperature on the back of the insert increases during the machining pass and decreases as the tool is moved from the end of the machining pass back to the free end of the part. The temperature then rises at the initiation of another machining pass. For the indirectly cooled tool insert, the temperature rose during the initiation of machining, but reached a stable value (rather than continuing to increase) during the machining pass. Thus, the indirectly cooled tool insert was more thermally stable than an insert operating under conventional flood cooling or dry machining conditions. Temperatures were measured during fifteen such cycles, corresponding to 15 machining passes. In the case of the cutting tool with indirect insert cooling, there is a three-minute period during which the system is pre-cooled prior to machining. The flow of coolant during the pre-cooling period is included in the calculation of the total flow rate required for the cutting tool system. Without the micro-channel heat exchanger, the insert temperature is only reduced by about 50 Kelvin compared to dry cutting. The insert temperature was not accurately measured during cooling with a jet of the coolant due to the positioning of the thermocouple. However, based on the flank wear results and the relatively poor heat transfer capability of these cutting fluids, it can reasonably be inferred that the temperature of the back of the insert was near the temperature measured for dry cutting.

Benefits

The cutting tool with the micro-channel heat exchanger 22 for indirect cutting tool cooling provides several performance benefits. The environmental impact of the machining process is reduced by 21% for dry machining and by a factor of two for jet cooling with a synthetic coolant. Tool life increases by 50% at high cutting speeds and 700% at low cutting speeds. Part production costs decrease by at least 20%. Final part quality is improved while maintaining a high degree of dimensional accuracy in the finished part.

The indirect cooling method has several environmental and cost benefits:

Zero Toxic Emissions. The use of inert, liquid nitrogen as described above is a prevention-oriented, pollution control approach that eliminates the toxic emissions from machining processes associated with cutting fluids. The indirect cooling method produces only inert gaseous nitrogen at flow rates that are two hundred and fifty times less than conventional direct cooling methods. The small amount of nitrogen used in the process can be easily and safely vented to the environment.

Low Cost. Cost studies show that the indirect cooling method represents the lowest cost option for machining when compared to dry cutting or jet cooling using a synthetic coolant. The costs of procurement, maintenance, cleaning, and disposal of cutting fluids are eliminated. The implementation of indirect cooling requires no significant modifications to the machine tool, and as a result, it can be easily and affordably implemented by both large and small machining centers.

Very Low-Flow Rate of Working Fluid. Because of its high-heat transfer capability, the indirect cooling method requires only 10 liters of liquid nitrogen to increase the cutting tool life by two-fold or more compared to an equivalent conventional machining operation using 2000 liters of synthetic coolant. These coolant volumes are representative of the coolant requirements of one machine operating continuously over an eight-hour shift.

All the Benefits of Dry Cutting. One of the primary benefits of dry cutting is that the chips and the finished part exit the machine clean, dry, and ready for the next production step. Using indirect cooling, the same benefits are realized at a lower cost.

Having thus described the device, various modifications and alterations will be apparent to those skilled in the art, which modifications and alterations will be within the scope of the invention as defined by the appended claims.

We claim:

1. A device for indirectly cooling a cutting tool element that is mounted on a cutting tool holder, the cutting tool element having at least one cutting tool edge, the device comprising:
   a heat exchanger mounted in the end of the cutting tool holder between the cutting tool element and the cutting tool holder, the heat exchanger having an external surface and an internal surface; and,
   a source of coolant for supplying coolant at less than ambient temperature to the internal surface of the heat exchanger; whereby the external surface of the heat exchanger is in heat exchanging relationship with the cutting tool element and coolant that is supplied to the internal surface of the heat exchanger removes heat from the heat exchanger to cool the element.

2. The device of claim 1 further comprising:
   a heat exchanger manifold and a cover plate comprising the heat exchanger, whereby when the cover plate is mounted on the heat exchanger manifold, a cavity is formed in the interior of the heat exchanger.

3. The device of claim 2 further comprising:
   a coolant inlet tube coupled to a first aperture in the heat exchanger and a coolant outlet tube coupled to a second aperture in the heat exchanger, the coolant inlet tube coupling a source of coolant to the cavity of the heat exchanger.

4. The device of claim 3 further comprising:
   a plurality of heat transfer fins positioned in the cavity of the heat exchanger, whereby the heat transfer fins enhance the ability of the heat exchanger to remove heat from the insert.

5. The device of claim 4 wherein the cutting tool element is a cutting tool insert.

6. The device of claim 4 wherein the cutting tool element is brazed or otherwise permanently affixed to the cutting tool holder.

7. The device of claim 4 wherein the cutting tool element is integral with the cutting tool holder.

8. The device of claim 4 further comprising:
   a coolant inlet zone in the cavity, the coolant inlet zone including the aperture for the coolant inlet tube and being adjacent to the at least one cutting edge of the element, whereby the coolant entering the cavity first enters the coolant inlet zone to provide maximum cooling to the at least one cutting tool edge of the element.

9. The device of claim 8 further comprising:
   a plurality of channels formed between the parallel heat transfer fins, whereby coolant in the cavity flows from the first aperture to the coolant inlet zone and through the channels between the heat transfer fins to provide cooling for the element.

10. The device of claim 9 further comprising:
    a coolant outlet zone formed in the cavity on the opposite side of the cavity from the coolant inlet zone, whereby the coolant enters the cavity on one side of the heat exchanger, and is conducted through channels formed between the parallel heat transfer fins to the coolant outlet zone on the opposite side of the cavity.

11. The device of claim 10 whereby the sides of the heat transfer fins are perpendicular to the at least one cutting tool edge and the ends of the heat transfer fins are at an angle to the at least one cutting tool edge so that the coolant inlet zone has the shape of a triangle with the inlet from the coolant inlet tube being located in the triangle.

12. The device of claim 1 further comprising:
    a thermal insulator positioned on the end of the cutting tool between the cutting tool body and the heat exchanger, whereby the exchange of heat between the cutting tool body and the heat exchanger is reduced.

13. The device of claim 1 further comprising:
    a thermal conductor positioned between the heat exchanger and the element, whereby the exchange of heat between the element and the heat exchanger is increased.

14. The device of claim 10 further comprising:

liquid nitrogen comprising the coolant, whereby liquid nitrogen enters the coolant inlet zone from the coolant inlet tube, passes through the channels between the heat transfer fins, and enters the coolant outlet zone before exiting the cavity of the heat exchanger by means of the coolant outlet tube.

15. The device of claim 14 whereby the liquid nitrogen is able to reduce the temperature of the insert during machining a workpiece by more than 200 Kelvin compared to machining the workpiece using dry machining techniques.

16. The device of claim 14 whereby the liquid nitrogen is able to reduce the temperature of the insert when machining a workpiece using a flow rate that is less than one percent of the flow rate required for synthetic coolants when machining the same workpiece.

17. The device of claim 14 wherein the liquid nitrogen in the heat exchanger uses the latent heat of vaporization of the liquid nitrogen to remove heat from the element.

18. The device of claim 1 further comprising:

liquid nitrogen comprising the coolant that is supplied to the internal surface of the heat exchanger, whereby the liquid nitrogen in the heat exchanger uses the latent heat of vaporization of the liquid nitrogen to remove heat from the cutting tool element.

* * * * *

UNITED STATES PATENT AND TRADEMARK OFFICE
CERTIFICATE OF CORRECTION

Page 1 of 2

PATENT NO. : 8,061,241 B2
APPLICATION NO. : 12/418688
DATED : November 22, 2011
INVENTOR(S) : Jay Christopher Rozzi et al.

It is certified that error appears in the above-identified patent and that said Letters Patent is hereby corrected as shown below:

In the Drawings

In the drawings, Sheet 3 of 3 Fig(s) 6 should be deleted and substitute therefore the attached sheet 3 of 3, Fig. 6.

Signed and Sealed this
Tenth Day of April, 2012

David J. Kappos
*Director of the United States Patent and Trademark Office*

FIG. 6

FIG. 7